(12) United States Patent
Sakamoto (10) Patent No.: US 6,976,738 B2
(45) Date of Patent: Dec. 20, 2005

(54) RECLINER ADJUSTER

(75) Inventor: Yutaka Sakamoto, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/732,308

(22) Filed: Dec. 11, 2003

(65) Prior Publication Data

US 2004/0135415 A1    Jul. 15, 2004

(30) Foreign Application Priority Data

Dec. 12, 2002  (JP) .............................. 2002-360814

(51) Int. Cl.[7] .............................. B60N 2/22; B60N 2/42
(52) U.S. Cl. ......................... 297/362.14; 297/216.13; 297/366
(58) Field of Search ..................... 297/216.13, 216.14, 297/216.1, 366, 362.11, 362.14

(56) References Cited

U.S. PATENT DOCUMENTS

| 5,295,730 A | * | 3/1994 | Rees | 297/361.1 |
| 5,884,972 A | * | 3/1999 | Deptolla | 297/378.11 |
| 5,997,089 A | * | 12/1999 | Kawasaki | 297/362.14 |
| 6,428,104 B1 | | 8/2002 | Sakamoto et al. | |
| 6,554,361 B2 | * | 4/2003 | Reubeuze et al. | 297/367 |
| 6,669,296 B2 | * | 12/2003 | Moriyama et al. | 297/367 |
| 6,764,136 B2 | * | 7/2004 | Sakamoto | 297/362.14 |

FOREIGN PATENT DOCUMENTS

| JP | 42-7950 | 4/1967 |
| JP | 10-217817 | 8/1998 |
| JP | 2000-342371 | 12/2000 |

* cited by examiner

Primary Examiner—Peter M. Cuomo
Assistant Examiner—Joe Edell
(74) Attorney, Agent, or Firm—Wenderoth, Lind & Ponack, L.L.P.

(57) ABSTRACT

A recliner adjuster for appropriately adjusting an inclination of a seat back with respect to a seat cushion includes a worm gear rotatably mounted on the seat cushion and a helical gear mounted on the seat back via an auxiliary locking mechanism and held in engagement with the worm gear. During normal use, the seat back is held at a predetermined angle with respect to the seat cushion by the engagement of the helical gear with the worm gear. When a load greater than a predetermined value is inputted to the seat back, the auxiliary locking mechanism acts to hold the seat back at the predetermined angle with respect to the seat cushion.

2 Claims, 7 Drawing Sheets

RECLINER ADJUSTER

BACKGROUND OF THE INVENTION

1. Field of the Invention

The present invention relates to a recliner adjuster attached to, for example, an automobile seat for appropriately adjusting the inclination of a seat back with respect to a seat cushion.

2. Description of the Related Art

In a recliner adjuster disclosed in Japanese Utility Model Publication (examined) No. 42-7950, a sector gear is fixed to a seat back while a worm gear, which can be freely engaged with and disengaged from the sector gear, is rotatably attached to a seat cushion. The worm gear is connected to an operation shaft and, by pulling the operation shaft in the axial direction thereof and by subsequently lifting it up, the engagement between the worm gear and sector gear is released. When a load is applied to the seat back in this state, the seat back tilts and the inclination thereof can be altered quickly. When the hand is released from the operation shaft, the worm gear and sector gear reengage to hold the seat back in that position. In addition, if fine adjustment of the inclination of the seat back is required, when the operation shaft is rotated to rotate the worm gear, the sector gear held in engagement with the worm gear rotates gradually, making it possible to smoothly alter the seat back to the desired inclination.

In another recliner adjuster disclosed in Japanese Laid-Open Patent Publication (unexamined) No. 10-217817, a sector gear and a worm gear having a lead angle greater than the friction angle are attached to a seat back and a seat cushion, respectively. According to this recliner adjuster, by tilting the seat back, the worm gear is caused to rotate by way of the sector gear, making it possible to appropriately alter the inclination of the seat back.

However, in the recliner adjuster having a sector gear and a worm gear held in engagement with each other, a problem sometimes occurs in that abnormal noise is generated by the backlash which represents the play between the teeth surfaces of the sector gear and worm gear.

To solve this problem, Japanese Laid-Open Patent Publication (unexamined) No. 2000-342371 has proposed reducing the backlash between the sector gear and worm gear.

In the above-described conventional recliner adjusters, if a large deceleration or acceleration is applied to the vehicle body due to, for example, a collision of the vehicle, a large load is applied to the mating surfaces of the sector gear and worm gear. In view of this, the strength required to withstand such a large load is ensured by employing a sector gear and a worm gear of a size greater than a predetermined size. That is, in order to enhance the strength of the recliner adjuster, it is necessary to enlarge not only the sector gear and worm gear but component parts associated therewith.

SUMMARY OF THE INVENTION

The present invention has been developed to overcome the above-described disadvantages.

It is accordingly an objective of the present invention to provide a compact recliner adjuster capable of withstanding a large load with the use of a worm gear and another gear having a strength required in normal use.

In accomplishing the above and other objectives, the recliner adjuster according to the present invention includes a worm gear rotatably mounted on the seat cushion, a helical gear held in engagement with the worm gear, and an auxiliary locking mechanism by way of which the helical gear is mounted on the seat back. During normal use, the seat back is held at a predetermined angle with respect to the seat cushion by the engagement of the helical gear with the worm gear. When a load greater than a predetermined value is inputted to the seat back, the auxiliary locking mechanism acts to hold the seat back at the predetermined angle with respect to the seat cushion.

By this construction, a compact recliner adjuster capable of withstanding a large load can be realized using a worm gear and a helical gear having a strength required in normal use.

The auxiliary locking mechanism includes first and second gears having respective teeth surfaces spaced a predetermined distance, wherein the load greater than the predetermined value is inputted to the seat back, the first gear is partly deformed to engage with the second gear.

Advantageously, the first gear is an external gear connected to the helical gear, and the second gear is an internal gear mounted on the seat cushion and disposed radially outward of the external gear.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

This application is based on an application No. 2002-360814 filed Dec. 12, 2002 in Japan, the content of which is herein expressly incorporated by reference in its entirety.

FIGS. 1 to 7 depict a recliner adjuster A according to the present invention, which includes a pair of brackets 2,4 spaced a predetermined distance apart, a worm gear 6 rotatably mounted on the pair of brackets 2, 4, and a helical gear 8 held in engagement with the worm gear 6. The brackets 2, 4 are mounted on a seat cushion (not shown), while the helical gear 8 is mounted on a seat back (not shown) via a plurality of pins, an external gear, and a central shaft in the manner as explained later. The seat back is always biased frontward by an elastic force of a balance spring (not shown). Both the worm gear 6 and the helical gear 8 held in engagement with each other have a lead angle greater than the friction angle.

The worm gear 6 has a front end rotatably supported by a front bearing 10 and a rear end rotatably supported by a rear bearing 12, and both the front and rear bearings 10, 12 are secured to the brackets 2, 4. The brackets 2, 4 have generally rectangular openings 2a, 4a defined therein at locations confronting the worm gear 6. The worm gear 6 partly protrudes externally through the openings 2a, 4a, thereby avoiding interference with the brackets 2, 4. That is, the presence of the openings 2a, 4a in the brackets 2, 4 can reduce the distance required between the brackets 2, 4.

The worm gear 6 has a large number of notches 6a in the form of a gear on a tooth crest thereof positioned in the proximity of the front bearing 10. A locking member 14 is interposed between the brackets 2, 4 so as to rotate about a mounting shaft 16 secured to the brackets 2, 4. The locking member 14 has a locking piece 14a that confronts the notches 6a from below for engagement with the notches 6a. The locking member 14 also has an operating lever 14b with which the locking piece 14a can be manually moved up and down to lock or unlock the notches 6a. The locking member 14 further has a lever 14c fixedly connected to one end of a coil spring (not shown), the other end of which is fixedly connected to a pin 18 secured to the brackets 2, 4. The operating lever 14b is connected to an operating knob (not shown) via a pin 17, which is loosely inserted in an elongated opening 4b defined in the bracket 4.

Figure 1:
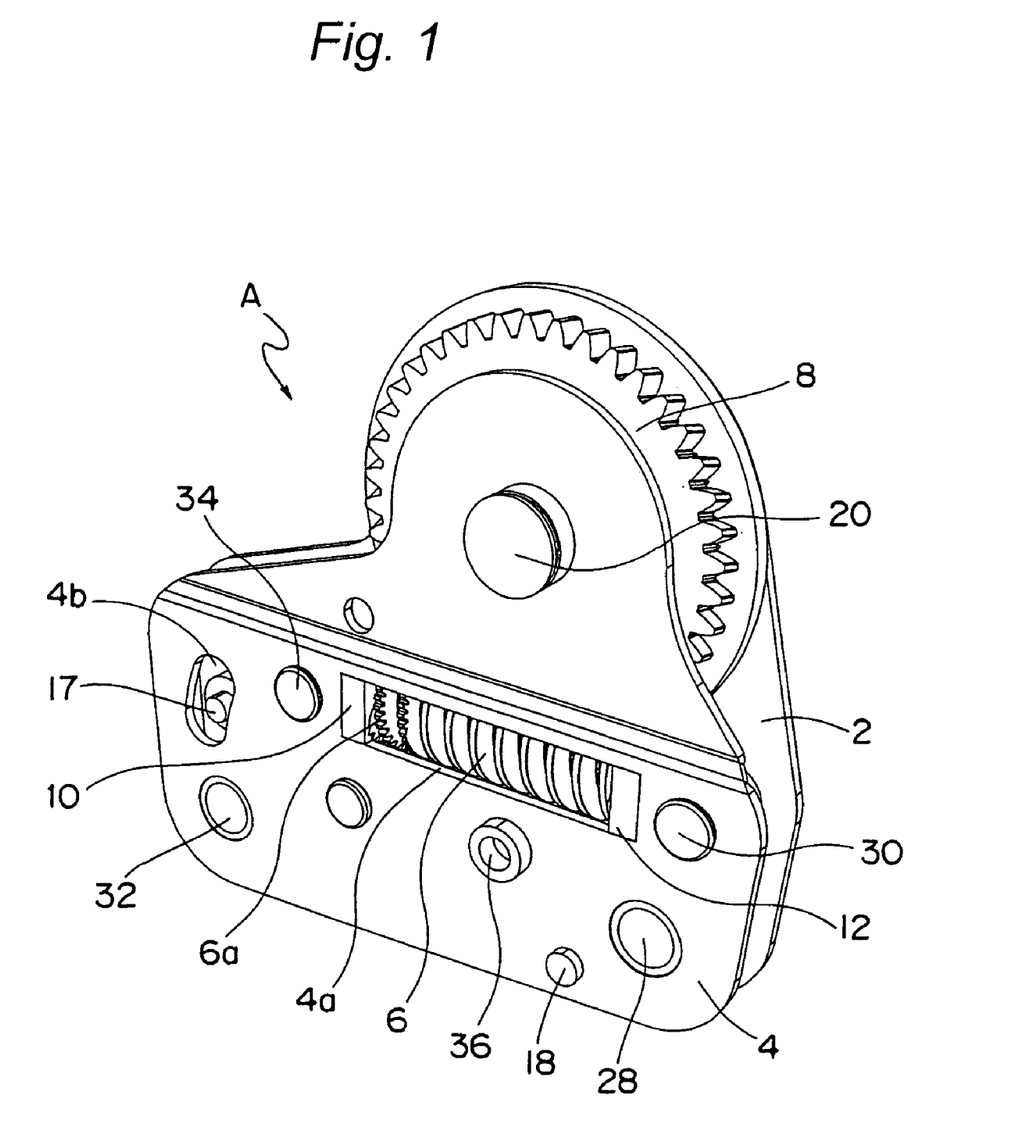
FIG. 1 is a perspective view of a recliner adjuster according to the present invention.
Figure 2:
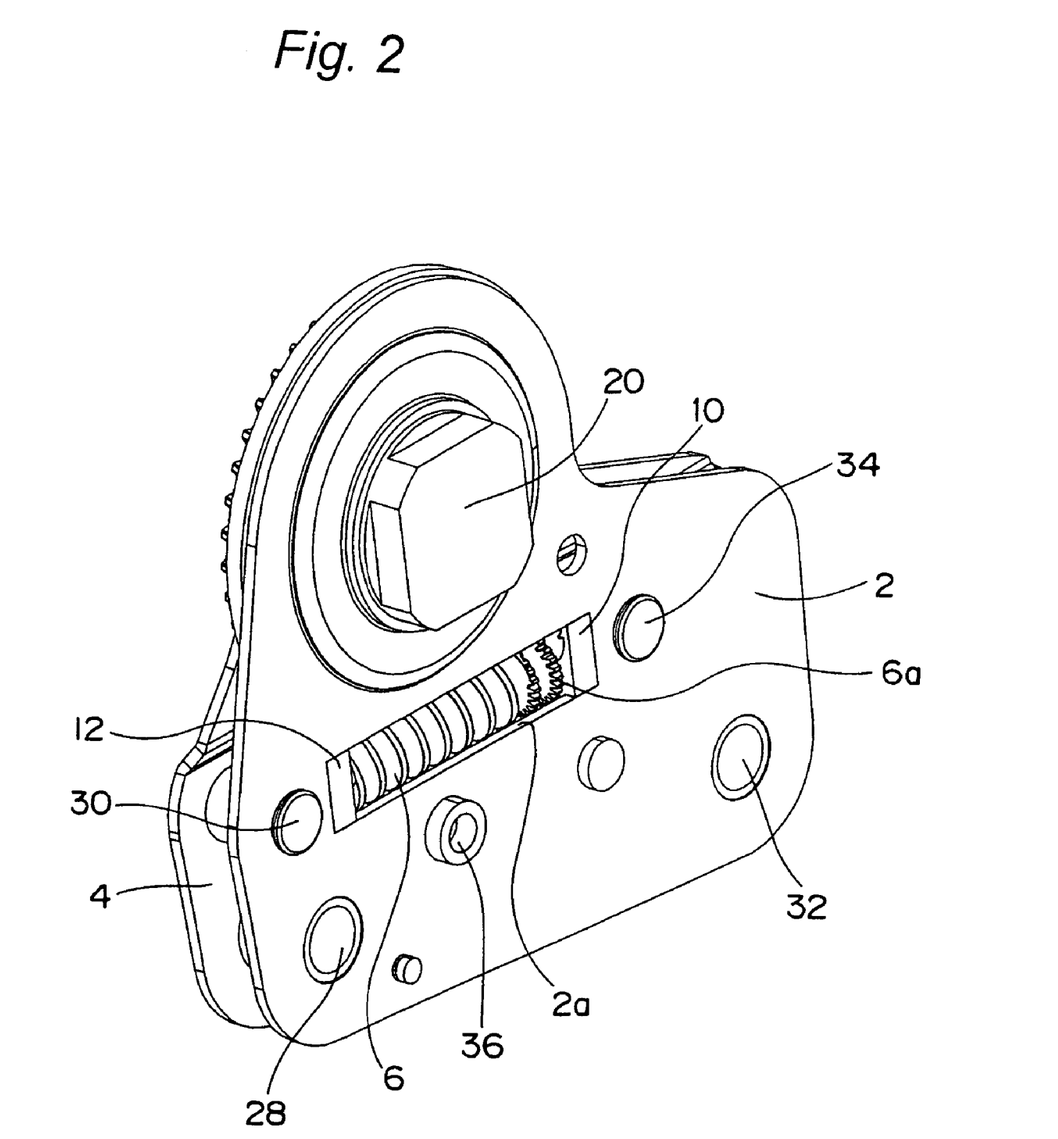
FIG. 2 is another perspective view of the recliner adjuster of FIG. 1.
Figure 3:
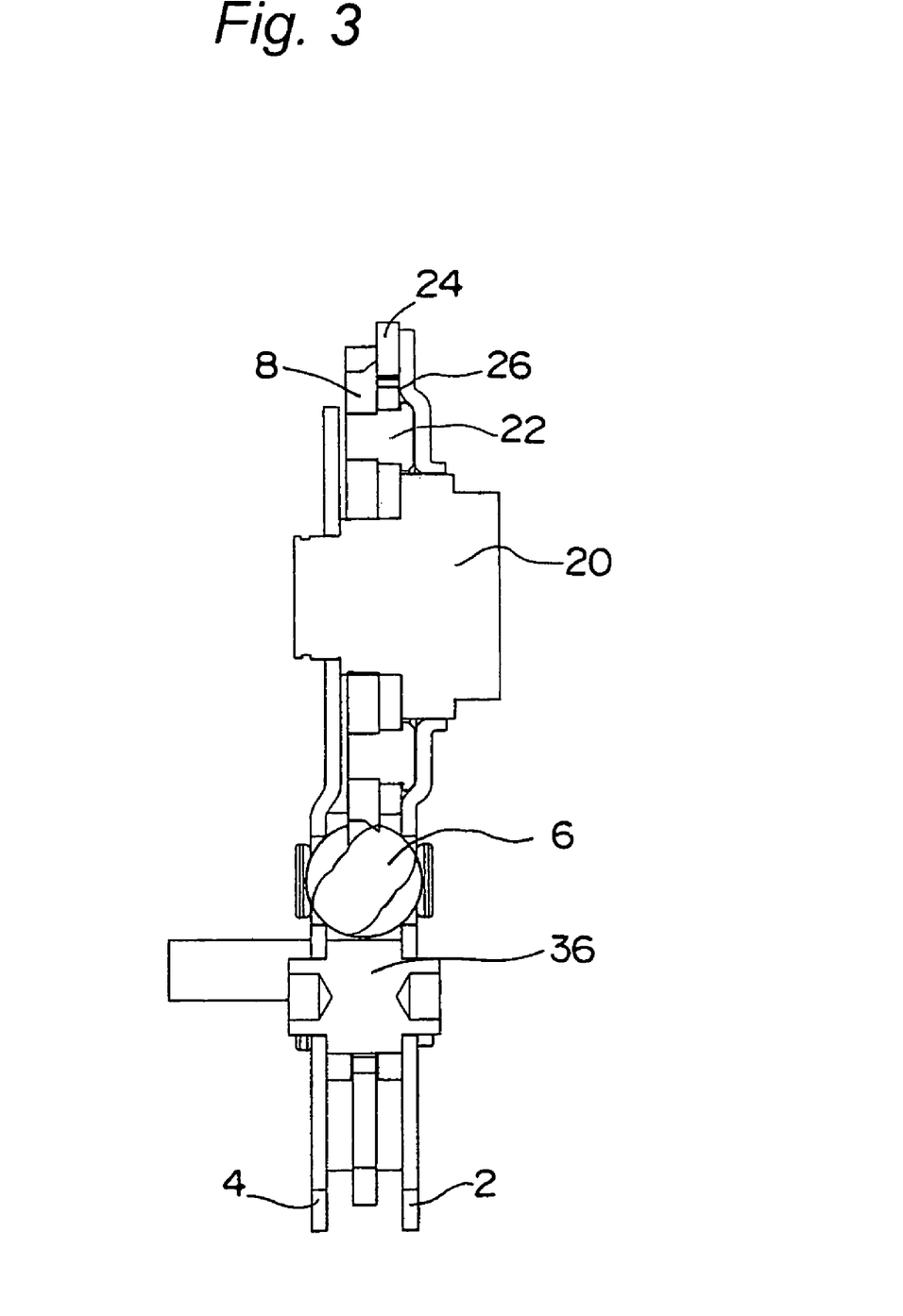
FIG. 3 is a vertical sectional view of the recliner adjuster of FIG. 1.
Figure 4:
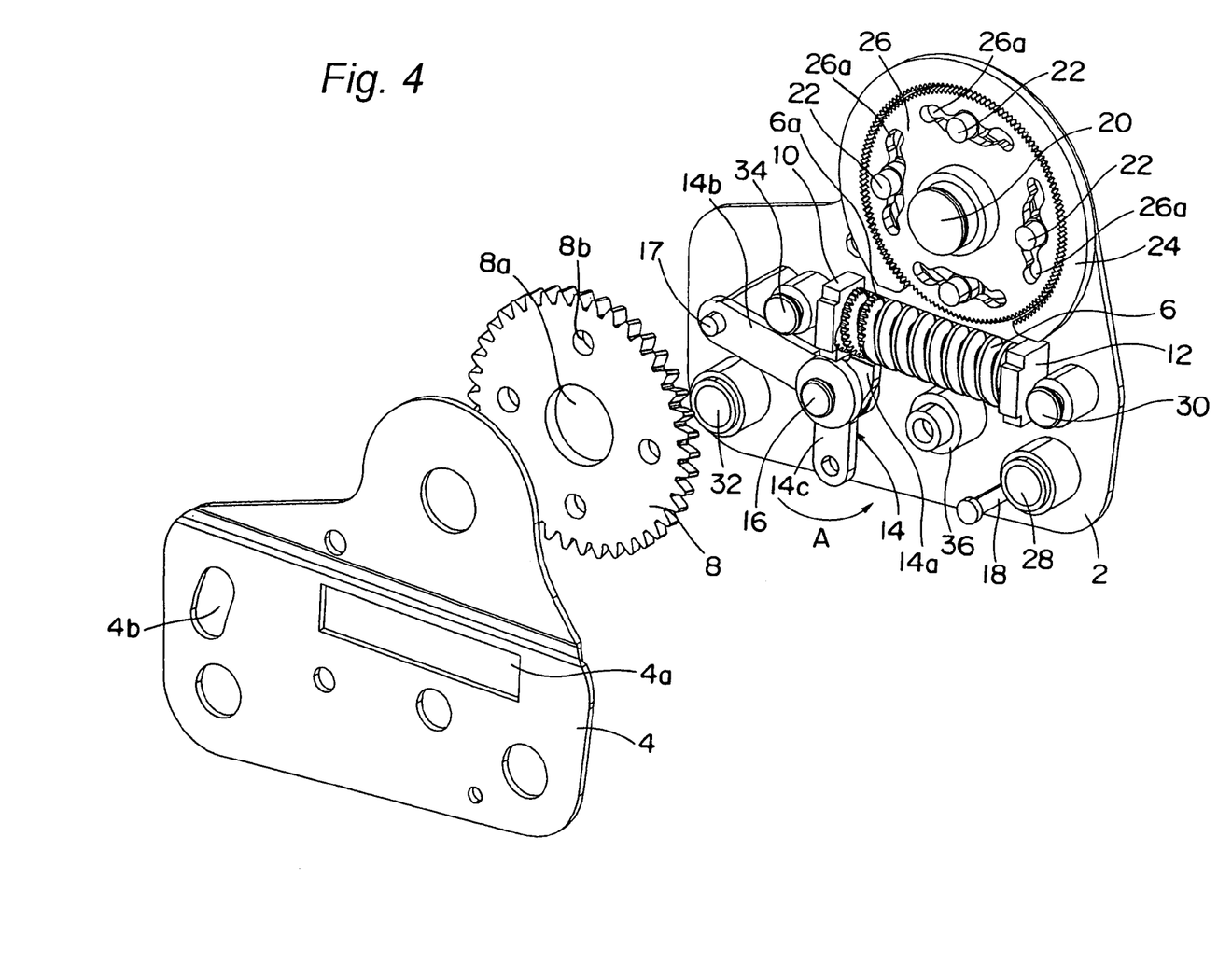
FIG. 4 is an exploded perspective view of the recliner adjuster of FIG. 1.
Figure 5:
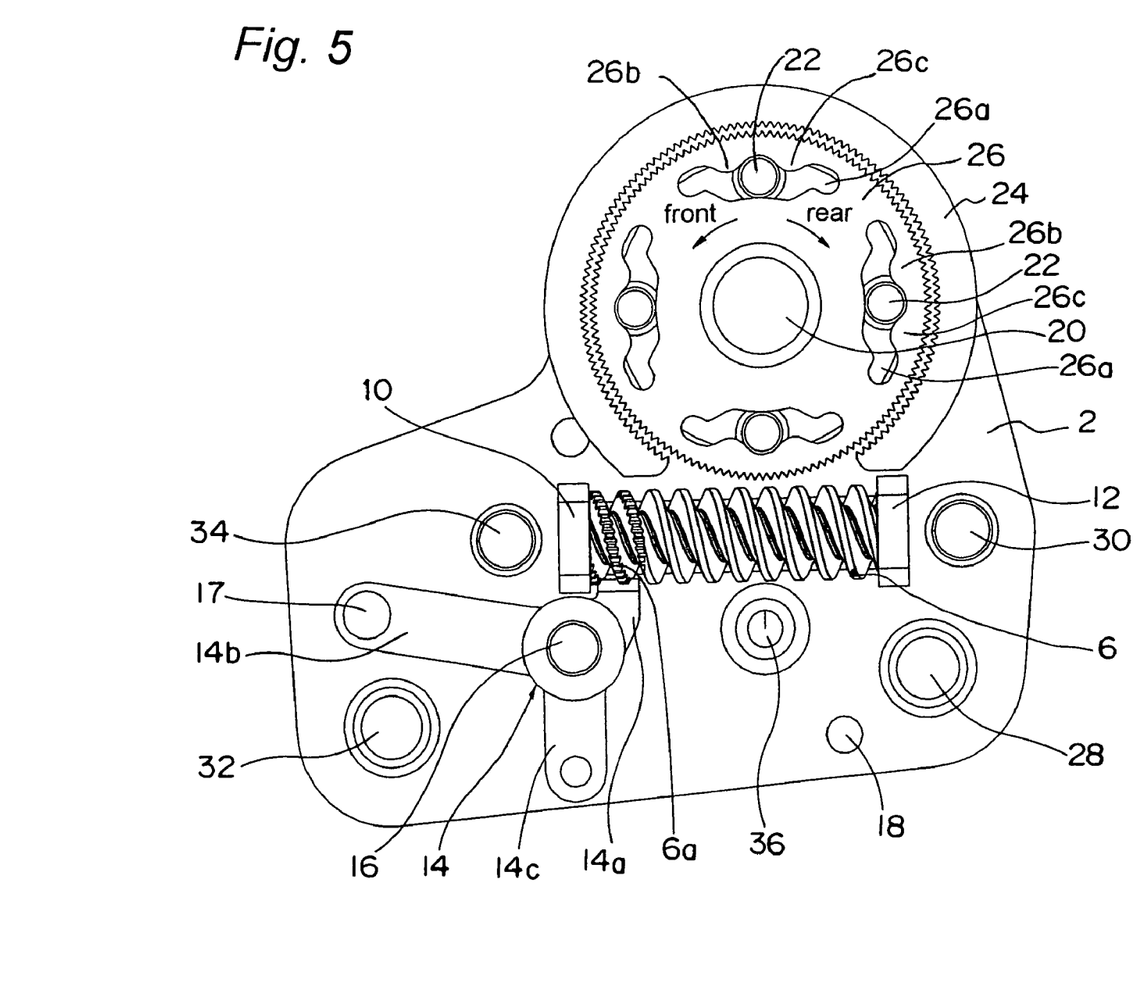
FIG. 5 is a front view of the recliner adjuster of FIG. 1 with one of a pair of brackets removed.
Figure 6:
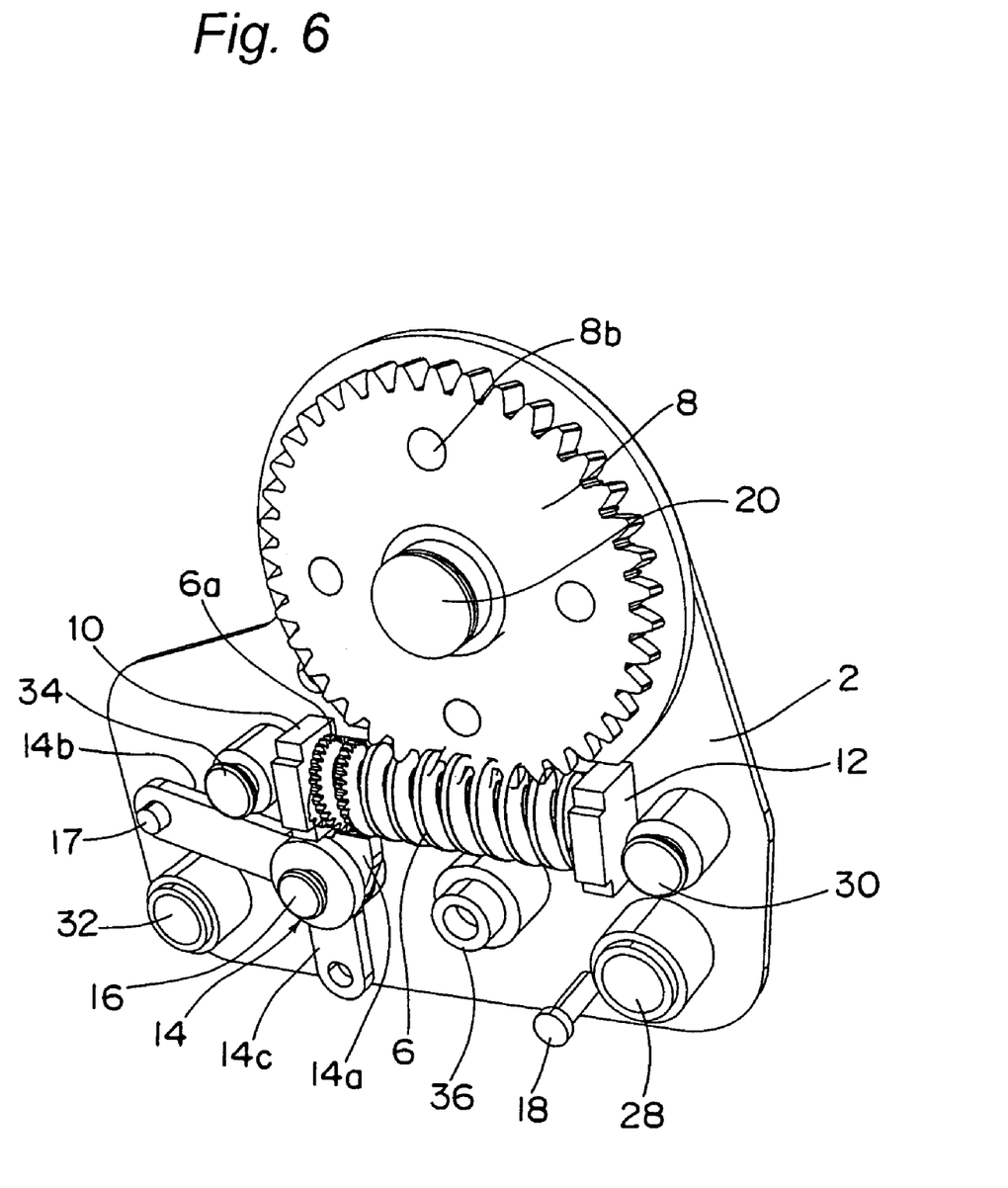
FIG. 6 is a perspective view of the recliner adjuster of FIG. 5.
Figure 7:
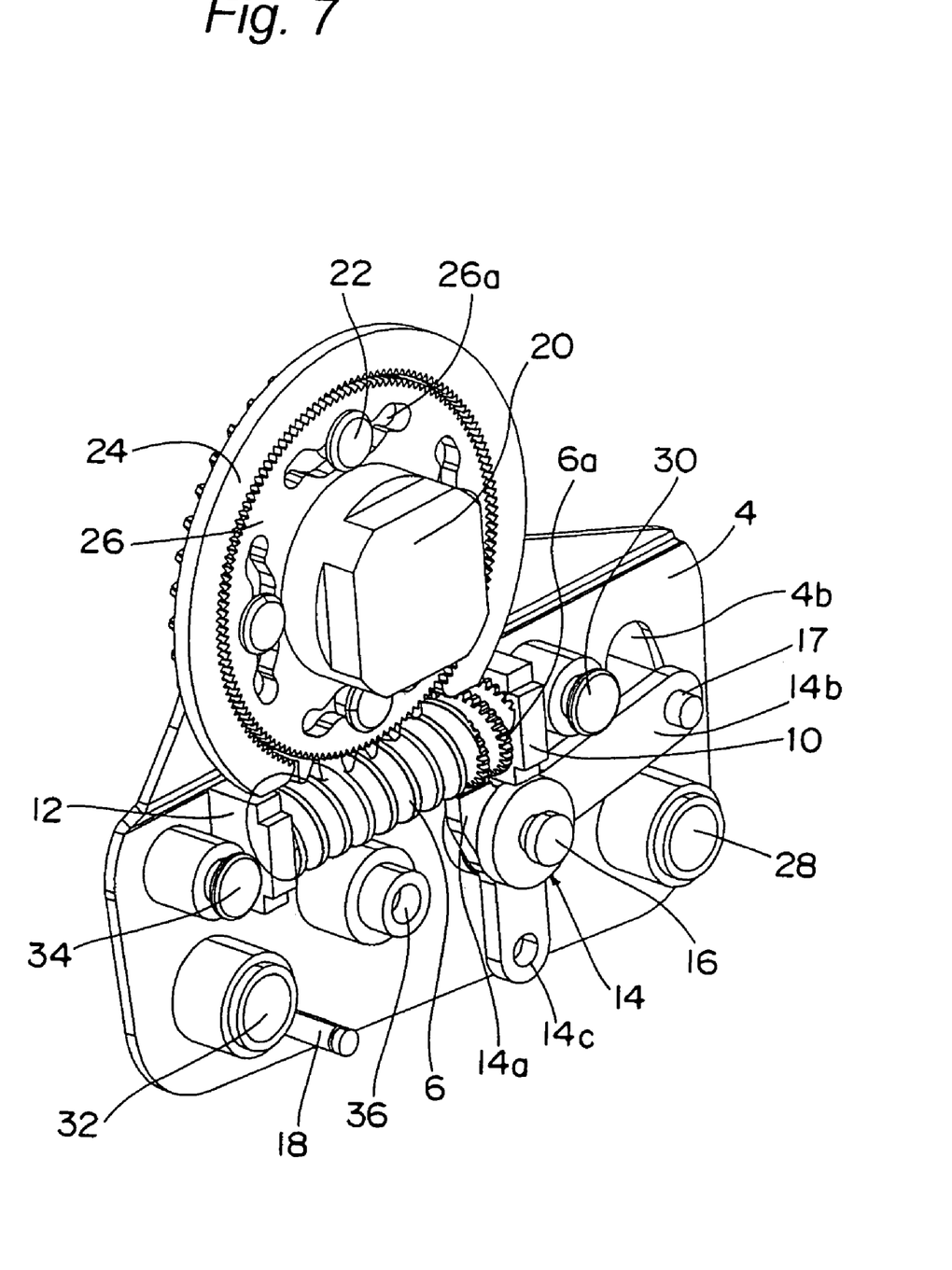
FIG. 7 is a perspective view of the recliner adjuster of FIG. 1 with the other of the pair of brackets removed.

The helical gear 8 has a round central hole 8a defined therein and is rotatably mounted on a central shaft 20 loosely inserted in the central hole 8a. As shown in FIGS. 3 and 7, the central shaft 20 has a generally rectangular end that protrudes externally from the bracket 2 and is fixed to the seat back. The helical gear 8 also has a plurality of (for example, four) pin holes 8b defined therein around the central hole 8a at regular intervals, and one end of a pin 22 is received in each of the pin holes 8b.

An external gear 26 fixed to the central shaft 20 is interposed between the helical gear 8 and the bracket 2 and brought into engagement with an internal gear 24 when a large load is inputted. The external gear 26 has a plurality of (for example, four) undulated slots 26a defined therein around the central shaft 20 at regular intervals, and the other end of the aforementioned pin 22 is loosely inserted in a central portion of each of the undulated slots 26a.

The internal gear 24 is secured to the bracket 2 and concentrically disposed around the external gear 26 so that internal teeth of the former confront external teeth of the latter with a predetermined distance therebetween. The internal gear 24 has a cut-out defined at a lower portion thereof above the worm gear 6 to avoid interference with the worm gear 6.

In FIGS. 1 to 7, reference numerals 28, 30, 32, 34, 36 denote fixing shafts for holding the two brackets 2, 4 in a mutually spaced relationship.

The recliner adjuster A of the above-described construction operates as follows.

Under the normal condition in which the operating knob connected to the pin 17 of the locking member 14 is not operated, the locking member 14 is biased in the direction of an arrow A by the elastic force of the coil spring fixedly connected to the lever 14c, and the locking piece 14a is held in engagement with one of the notches 6a of the worm gear 6. Accordingly, rotation of the worm gear 6 is not allowed, preventing rotation of the helical gear 8 held in engagement with the worm gear 6. Because the external gear 26 is fixed to the seat back via the central shaft 20 and connected to the helical gear 8 via the pins 22, the inclination of the seat back relative to the seat cushion is held at a predetermined angle.

When a change in inclination of the seat back is desired, the operating knob is operated to rotate the locking member 14 in the direction counter to the direction of the arrow A against the elastic force of the coil spring. As a result, the engagement of the locking piece 14a with one of the notches 6a of the worm gear 6 is released, and the worm gear 6 is allowed to freely rotate.

Because both the worm gear 6 and the helical gear 8 held in engagement with each other have a lead angle greater than the friction angle, the worm gear 6 rotates with rotation of the helical gear 8 about the central shaft 20. Accordingly, the seat back is inclined frontward by the elastic force of the balance spring, or inclined rearward by applying a rearward load to the seat back against the elastic force of the balance spring. When the hand is released from the operating knob at a desired position, the locking piece 14a of the locking member 14 is again brought into engagement with one of the notches 6a of the worm gear 6 by the elastic force of the coil spring. As a result, rotation of the worm gear 6 is not allowed, and the inclination of the seat back is held at the current angle.

The case where a large load greater than a predetermined value is inputted to the seat back due to, for example, a collision of the vehicle is discussed hereinafter.

If a large load greater than the loads during normal use is applied to the seat back, the load is transmitted from the seat back to the central shaft 20, external gear 26, pins 22, and helical gear 8 in this order. At this moment, the helical gear 8 is held in engagement with the worm gear 6 and is, hence, prevented from rotating. Accordingly, a large load is applied to the mating surfaces of the pins 22 and the undulated slots 26a.

More specifically, if a large frontward load is applied to the seat back, the large load is applied to a first protrusion 26b positioned frontward of each of the pins 22. On the other hand, if a large rearward load is applied to the seat back, the large load is applied to a second protrusion 26c positioned rearward of each of the pins 22 (see FIG. 5). As a result, either the first protrusion 26b or the second protrusion 26c is pressed outward and deformed, and the teeth surface positioned radially outward thereof is moved outward, thus causing the teeth formed on such teeth surface to be brought into engagement with the internal gear 24. Accordingly, the seat back is prevented from further inclining frontward or rearward.

That is, even if a large deceleration or acceleration is applied to the vehicle body due to, for example, a collision of the vehicle, an auxiliary locking mechanism including the external gear 26, pins 22, internal gear 24 and the like prevents the seat back from inclining frontward or rearward.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recliner adjuster for appropriately adjusting an inclination of a seat back with respect to a seat cushion, comprising:
   a worm gear rotatably mounted on the seat cushion;
   a helical gear held in engagement with the worm gear;
   an auxiliary locking mechanism by way of which the helical gear is mounted on the seat back;
   wherein during normal use the seat back is held at a predetermined angle with respect to the seat cushion by the engagement of the helical gear with the worm gear;

wherein when a load greater than a predetermined value is inputted to the seat back, the auxiliary locking mechanism acts to hold the seat back at the predetermined angle with respect to the seat cushion; and wherein the auxiliary locking mechanism comprises first and second gears having respective teeth surfaces spaced a predetermined distance apart, and wherein when the load greater than the predetermined value is inputted to the seat back, the first gear is partly deformed to engage with the second gear.

2. The recliner adjuster according to claim 1, wherein the first gear is an external gear connected to the helical gear, and the second gear is an internal gear mounted on the seat cushion and disposed radially outward of the external gear.

* * * * *